April 11, 1967 W. H. RYAN 3,313,625
NOVEL PHOTOGRAPHIC PRODUCTS AND PROCESSES
Filed Jan. 9, 1964 2 Sheets-Sheet 1

INVENTOR.
William H. Ryan
BY Brown and Mikulka
and
Robert M. Ford
ATTORNEYS

United States Patent Office 3,313,625
Patented Apr. 11, 1967

3,313,625
NOVEL PHOTOGRAPHIC PRODUCTS AND PROCESSES
William H. Ryan, Carlisle, Mass., assignor to Polaroid Corporation, Cambridge, Mass., a corporation of Delaware
Filed Jan. 9, 1964, Ser. No. 336,785
4 Claims. (Cl. 96—29)

This application is a continuation-in-part of application Serial No. 35,216, filed June 10, 1960, now abandoned.

This invention relates to photography and, more particularly, to novel photographic diffusion transfer processes and products for utilization therein.

It is one object of the present invention to provide novel diffusion transfer processes and products for utilization therein whereby improved positive silver images may be produced.

Another object of the present invention is to provide novel diffusion transfer processes and products for utilization therein whereby improved additive color reproduction may be attained.

A further object of the present invention is to provide novel photographic products and processes wherein a diffusion transfer image is disposed in an image-receiving element exhibiting increased resistance to abrasion.

A still further object of the present invention is to provide novel photographic products and processes wherein a diffusion transfer image is disposed in a reception element comprising the reaction product of a bis-maleimide and gelatin.

Other objects of the present invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 3:
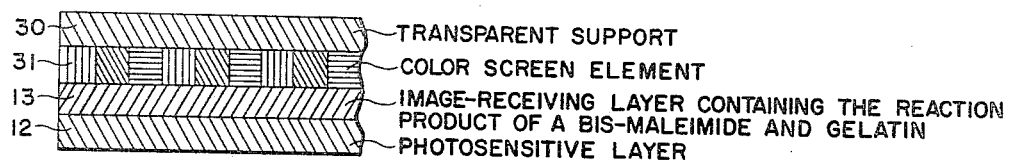
Figure 4:
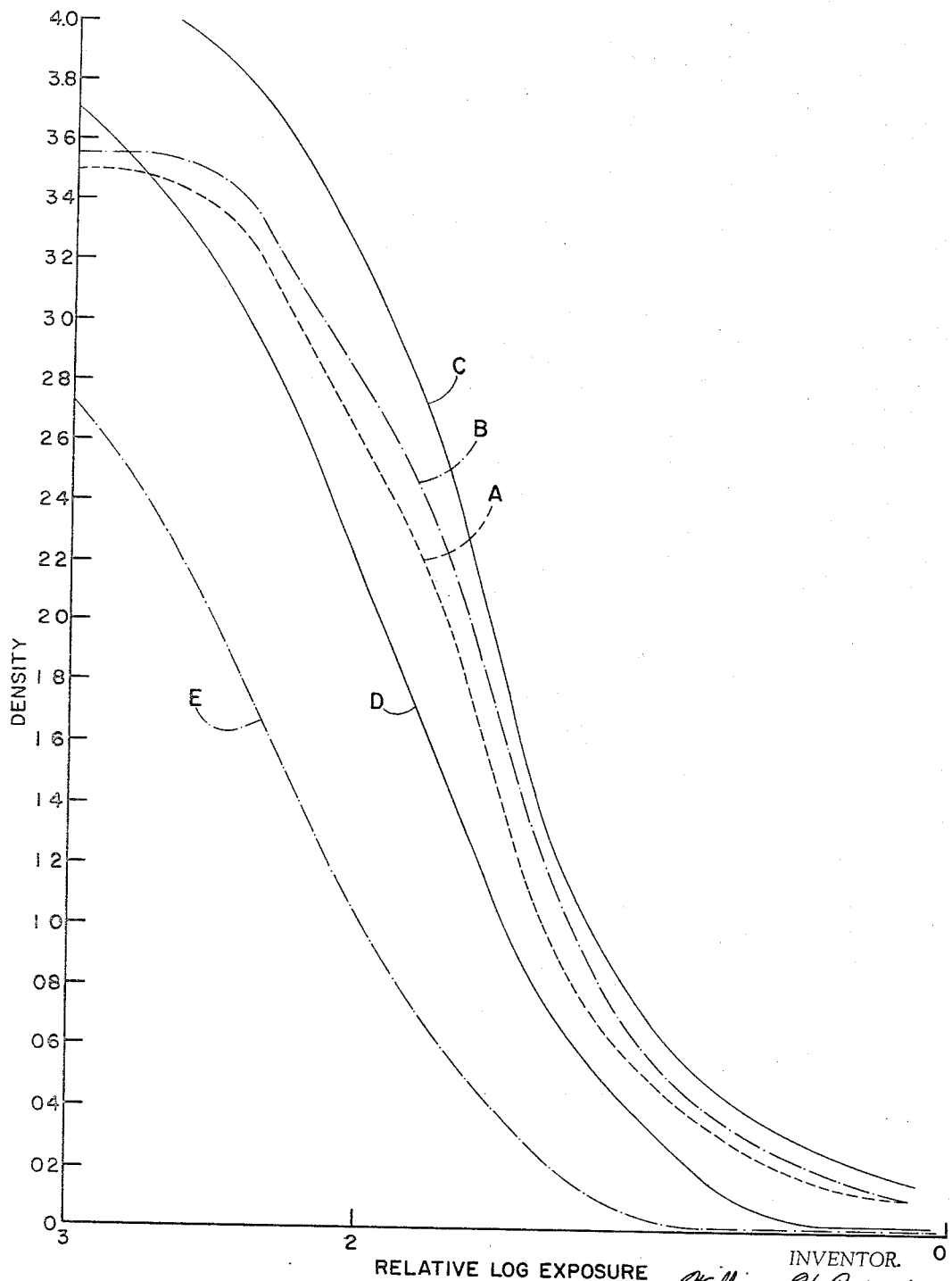

FIG. 3 is a diagrammatic enlarged cross-sectional view of one embodiment of the novel image-receiving elements of the present invention, for use in obtaining additive multicolor images, comprising a support, an additive color screen element, an embodiment of the present invention as the image-receiving stratum, and a photosensitive silver halide emulsion; and FIG. 4 is a graphic illustration of the density characteristics of certain image-receiving elements specified hereinafter.

The present invention comprehends improved processes and products of the type whereby a positive print is obtained in a single step by suitably treating an exposed photosensitive element, containing a latent image therein, in superposed relationship to an appropriate image-receiving element with a processing composition.

In diffusion transfer processes, for the formation of positive silver images, a latent image contained in an exposed photosensitive silver halide emulsion is developed and almost concurrently therewith a soluble silver complex is obtained by reaction of a silver halide solvent with the unexposed and undeveloped silver halide of said emulsion. Preferably, the photosensitive silver halide emulsion is developed with a processing composition in a viscous condition which is spread between the photosensitive element comprising the silver halide emulsion, and a print-receiving element comprising, preferably, a suitable silver precipitating layer. The processing composition effects development of the latent image in the emulsion and substantially contemporaneous therewith forms a soluble silver complex, for example, a thiosulfate or thiocyanate, with undeveloped silver halide. This soluble silver complex is, at least in part, transported in the direction of the print-receiving element and the silver thereof is largely precipitated in the silver precipitating layer of said element to form a positive image therein.

Additive color reproduction may be produced by exposing a photosensitive silver halide emulsion through an additive color screen having filter media or screen elements each of an individual additive color, such as red or blue or green, and by viewing the reversed or positive silver image formed by transfer to a transparent print-receiving element through the same or a similar screen which is suitably registered with the reversed positive image carried by the print-receiving layer.

It has now been discovered that diffusion transfer processes such as those mentioned above may be improved by the employment of the reaction product of at least one bis-maleimide and gelatin in the print-receiving element.

The utilization of the reaction product of a bis-maleimide and gelatin in the image-receptive layer itself provides an abrasion-resistant matrix which may be substantially flexible, semi-rigid or rigid depending upon the concentration of the maleimide employed and is permeable to both aqueous and alkaline solutions, but is substantially insoluble therein. In addition, this matrix affords substantial protection to the positive image. An image-receiving layer comprising, at least in part, the reaction product of a bis-maleimide and gelatin may be washed, for example, to effect removal of a photosensitive emulsion and/or film-forming processing composition adhered thereto, or residual, undesired agents remaining therein, without deleterious effects.

The reaction product of a bis-maleimide and gelatin may also be employed as a protective overcoat layer on the external surface of an image-receiving stratum which is subject to abrasion. The transparent, abrasion-resistant, water-insoluble, water and alkali-solution permeable polymeric layer serves to prevent subsequent laceration and degradation of the image-receptive stratum.

The concentration of bis-maleimide reacted with gelatin may be varied over a wide range according to the degree of rigidity required, during and subsequent to processing, and the thickness and character of the image-receiving stratum employed.

It will be noted that the image-receiving element may comprise an image-receptive layer, which contains the reaction product of a bis-maleimide and gelatin and, for example, silver precipitating agents, and, in addition, a protective overcoat layer comprising the reaction product of the same or a different bis-maleimide and gelatin and/or different concentration of the respective components.

In general the bis-maleimides useful in the practice of the present invention comprise compounds within the formula:

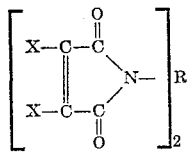

wherein each X may the same or different and comprise hydrogen or alkyll groups and at least one X is hydrogen; and R is a divalent organic radical. The preferred compounds within the formula comprise bis-maleimides wherein R is a divalent organic radical, comprising a lower alkylene group containing in the order of from 1 to 10 carbon atoms or a mononuclear cyclic group such as a phenylene group.

As examples of bis-maleimides suitable for use in the practice of the present invention, mention may be made of:

(1)
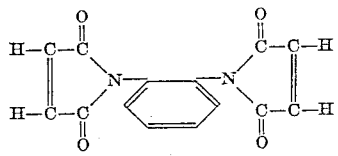
N,N'-(1,2-phenylene)-bis-maleimide (2)
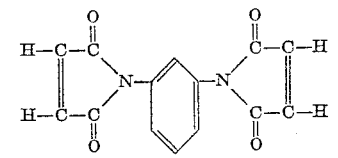
N,N'-(1,3-phenylene)-bis-maleimide (3)
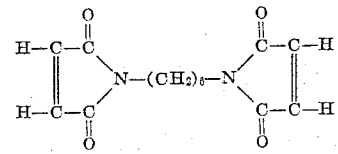
N,N'-hexamethylene-bis-maleimide (4)
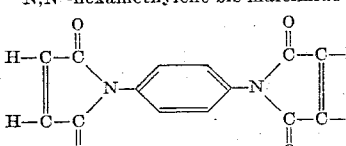
N,N'-(1,4-phenylene)-bis-maleimide The bis-maleimide employed may be prepared by conventional procedures known in the art. For example, compounds for use in the practice of the present invention may be synthesized according to the procedures disclosed in U.S. Patent No. 2,444,536 (1948) and Beilstein 21, 339–404.

Figure 1:
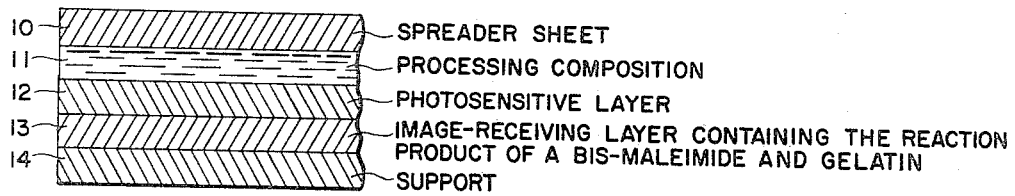
FIGURE 1 is a diagrammatic enlarged cross-sectional view illustrating the association of elements during one stage of the performance of a diffusion transfer process for the production of positive silver prints and showing, as one of the elements, an embodiment of the novel print-receiving elements of the present invention, the thicknesses of the various materials being exaggerated.

Referring now to FIGURE 1, one embodiment of the novel image-receiving layers of the present invention in the performance of a transfer process for the production of positive silver prints comprises a spreader sheet 10, a layer of relatively viscous processing agent 11, a photosensitive silver halide emulsion layer 12, an image-receiving layer 13 comprising a reaction product of a bis-maleimide and gelatin and preferably containing silver precipitating nuclei, such as the silver precipitating nuclei disclosed in U.S. Patent No. 2,698,237, issued Dec. 28, 1954, to Edwin H. Land, and a suitable support layer 14. Support layer 14 may comprise an opaque material where a reflection print is desired or may comprise a transparent material where a transparency is desired.

The image-receiving layers of this invention may be coated onto various types of rigid or flexible supports, for example, glass, paper, metal, polymeric films or both the synthetic types and those derived from naturally occurring products, etc. Especially suitable materials include paper; aluminum; polymethacrylic acid methyl and ethyl esters; vinyl chloride polymers; polyvinyl acetals; polyamides such as nylon; polyesters such as the polymeric films derived from ethylene glycol terephthalic acid; and cellulose derivatives such as cellulose acetate, triacetate, nitrate, propionate, butyrate, acetate-propionate, or acetate-butyrate. The supports generally preferred comprise paper or natural and synthetic gums and resins which will form continuous films and which are relatively stable, mechanically, in the presence of water and alkali.

One method of preparing the respective silver precipitating agent-containing layers comprises forming a dispersion of silver precipitating agents by vacuum depositing, as, for example, by cathode sputtering, an appropriate silver precipitating agent on a matrix and blending the resulting product in a coating solvent. Processes of the aforementioned type are disclosed in the copending U.S. application of Edwin H. Land, Ser. No. 249,922, filed Jan. 7, 1963.

In the formation of silver transfer prints by the previously mentioned processes, certain special matrices may be employed in which the silver precipitating agent is so dispersed as to effect a controlled precipitation of the soluble silver complex, the chosen matrix serving to receive and suitably aggregate the precipitated silver to produce therein positive images. Preferably, the silver precipitating agents are dispersed in a suitable matrix formed of particles, preferably colloidal in size, of a chemically inert, absorbent material. It is preferable that these particles have a relatively low coefficient of absorption for light as compared to silver and satisfactory examples of materials of this type are: colloidal silica, such as silica aerogel, Fuller's earth, diatomaceous earth, kieselguhr, wood flour, infusorial earth, bentonite, filter aids such as Celite and Super-Floss (trade names of Johns-Manville Sales Corp., New York, N.Y., for diatomaceous earth filtration aids), and finely powdered glass, talc, mica or zinc oxide.

The precipitation and aggregation of silver obtained by using silver precipitating agents may be improved and expedited by providing a print-receiving element having a plurality of layers containing a varying concentration of silver precipitating agents, especially wherein the concentration of silver precipitating nuclei progressively increases as the distance of the respective layers from the external surface of the image-receiving stratum increases (as disclosed in the copending U.S. application of Edwin H. Land, Ser. No. 858,454, filed Dec. 9, 1959). It will be recognized that the concentration of silver precipitating nuclei within one or more layers may remain constant or vary, that is, vary randomly or according to a prearranged distribution. In addition, the matrix of each layer may comprise, where desired, a single component or a mixture of components, and two or more layers may comprise different matrices.

The print-receiving element may be fabricated by successively applying to a suitable support the respective silver precipitating nuclei-containing layers. The respective layers are preferably dried prior to successive coating operations.

Advantageous results are obtained when the silver precipitating agents in the image-receiving layer are disposed in a matrix comprising, in part, submacroscopic agglomerates of minute particles of a suitable water-insoluble, inorganic, preferably siliceous material, such, for example, as silica aerogel. Suitable matrices of this type are disclosed in U.S. Patent No. 2,698,237.

Other techniques for incorporating a silver precipitating agent, such as dissolving said agent in a solution of the matrix-forming material, may also be employed.

It will be recognized that the silver-receptive stratum of the present invention may be so constituted as to provide an unusually vigorous elemental silver precipitating environment which causes the elemental silver deposited therein, in comparison with the amount of silver developed in the silver halide photosensitive layer, to possess very high covering power, that is, opacity per given mass of reduced silver.

Especially suitable as silver precipitating agents are the metallic sulfides and selenides, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$ and especially the salts of zinc, cadmium and lead. Also suitable as precipitating agents are heavy metals such as silver, gold, platinum, palladium and mercury, and in this category the noble metals are preferred and are preferably provided in the matrix as colloidal particles. The salts of these heavy metals, preferably the simple inorganic and readily reducible salts such as silver nitrate, gold chloride and gold nitrate, are also useful as silver precipitating agents. In some instances, the metals are introduced into the matrices as salts and then reduced in situ prior to the use of the reception material in the silver transfer process to give a layer whose silver precipitating agent is a colloidal metal. Where the salts are relatively light- or heat-sensitive, this reduction may be accomplished simply by exposing the silver precipitating layer to diffused light or to heat. Still other satisfactory silver precipitating agents are certain of the thio compounds, for example, dithiooxamate and its lead and zinc complexes, potassium dithiooxamate and the lead and nickel complexes thereof, and thioacetamide. The silver precipitating agents, as noted above, are provided in highly dispersed condition, preferably as colloidal particles.

Where the silver precipitating agent is one or more of the heavy metal sulfides or selenides, it is preferable to prevent the diffusion and wandering of the sulfide or selenide ions, as the case may be, by also including, in the silver precipitating layers or in separate layers closely adjacent thereto, at least one metallic salt which is substantially more soluble in the processing agent than the heavy metal sulfide or selenide used as the silver precipitating agent and which is irreducible in the processing agent. This more soluble salt has, as its cation, a metal whose ion forms sulfides or selenides which are difficulty soluble in the processing agent and which give up their sulfide or selenide ions to silver by displacement. Accordingly, in the presence of sulfide or selenide ions the metal ions of the more soluble salts have the effect of immediately precipitating the sulfide or selenide ions from solution. These more soluble or ion-capturing salts may be soluble salts of any of the following metals: cadmium, cerium (ous), cobalt (ous), iron, lead, nickel, manganese, thorium, and tin. Satisfactory soluble and stable salts of the above metals may be found, for example, among the following groups of salts: the acetates, the nitrates, the borates, the chlorides, the sulfates, the hydroxides, the formates, the citrates, and the dithionates. The acetates and nitrates of zinc, cadmium, nickel, and lead are preferred. In general, it is also preferable to use the white or lightly colored salts although for certain special purposes the more darkly colored salts may be employed.

The previously mentioned ion-capturing salts may also serve a function of improving the stability of the positive print provided they possess, in addition to the aforementioned characteristics, the requisites specified in U.S. Patent No. 2,584,030, issued to Edwin H. Land. For example, if the ion-capturing salt is a salt of a metal which slowly forms insoluble or slightly soluble metallic hydroxides with the hydroxyl ions in the alkaline processing liquid, it will suitably control the alkalinity of the print-receiving element to substantially, if not totally, prevent the formation of undesirable developer stains.

In addition to varying the concentration of the silver precipitating agents, one may also vary the thicknesses of individual layers of silver precipitating agents. It is also within the scope of this invention to utilize different silver precipitating agents in two or more of the layers and/or to utilize a mixture comprising two or more silver precipitating agents in one or more of the layers.

Liquid layer 11 may be obtained by spreading a photographic processing composition, for example, in a manner disclosed in U.S. Patent No. 2,698,244, issued Dec. 28, 1954, to Edwin H. Land. As disclosed in the aforementioned U.S. patent, the liquid processing composition may be disposed in a rupturable container so positioned in regard to the appropriate surface of the silver halide emulsion that, upon compression by spreader sheet 10, a substantially uniform layer 11 of processing composition is distributed over the external surface of photosensitive emulsion 12. The processing composition may be one of the film-forming processing composition disclosed in U.S. Patent No. 2,543,181, issued Feb. 27, 1951, to Edwin H. Land. It may comprise, for example, a developing agent such as hydroquinone, an alkali such as sodium hydroxide, a silver halide complexing agent such as sodium thiosulfate, and a high molecular weight film-forming thickening agent such as sodium carboxymethyl cellulose. All these materials are preferably in aqueous solution. These photographic agents are preferably contained in solution in the processing liquid prior to the spreading thereof as layer 11, but they may be, in whole or in part, added to the processing compositions as it is spread between spreader sheet 10 and photosensitive silver halide emulsion 12, said agents being so located on or adjacent to the surface of one or both of said layers as to be dissolved by or otherwise interacted with the liquid agent when the latter wets said surface.

In carrying out the aforementioned transfer process, the photosensitive silver halide emulsion 12 is exposed to a predetermined subject matter to form therein a latent image of said subject matter. A substantially uniform distribution of processing composition 11 is distributed on the external surface of said emulsion, as, for example, according to the previously described procedure. Processing composition reagents permeate into the photosensitive emulsion, developing the latent image contained therein according to the point-to-point degree of exposure of said emulsion. Substantially contemporaneous with the development of the latent image, an imagewise distribution of soluble silver complex is formed from unexposed silver halide within said emulsion. At least part of said silver complex, solubilized is transferred, by imbibition, to print-receiving stratum 13, comprising the reaction product of a bismaleimide and gelatin. The transferred silver complex is reached to provide a positive, reversed image of the latent image. Subsequent to formation of the positive image in the reaction product of a bis-maleimide and gelatin-containing image-receiving layer 13, dissociation of said layer from emulsion layer 12 may be effected.

Where desired, the image-receiving layer 13 may be dissociated from emulsion layer 12 by washing the emulsion from the surface thereof with water. It must be noted that the abrasion-resistant properties provided image-receiving element 13 by the reaction product of a bis-maleimide and gelatin alleviates the necessity of subsequently overcoating the external surface of image-receiving layer 13 with a transparent, abrasion-resistant, water-insoluble plastic to prevent subsequent laceration and resultant degradation of the positive image.

It will be apparent that the facility with which the photosensitive emulsion layer is dissociated from contact with the print-receiving element comprising the reaction product of a bis-maleimide and gelatin may be increased by providing a conventional stripping layer interposed between said emulsion and the print-receiving element. The stripping layer may be coated on the surface of the print-receiving element and the photosensitive emulsion thereafter coated on the external surface of said stripping layer.

The fabrication of the novel print-receiving elements of the present invention will be illustrated in greater detail in conjunction with the following specific examples which set out representative image-receiving elements and the utilization thereof in diffusion-transfer processes of the last-mentioned type. These examples are intended to be illustrative only.

EXAMPLE 1

A mixture comprising 7.5 cc. of 12% gelatin and 0.9 cc. of a mixture of silver precipitating agents, such as those previously described, was raised to pH 10 and 40° C. 1 cc. of 5% of N,N'-(1,3-phenylene)-bis-maleimide in dimethyl sulfoxide was added to the mixture. The resultant mixture was promptly coated on a subbed cellulose triacetate film base at room temperature. A mixture comprising 0.5 g. of cellulose acetate hydrogen phthalate, 70 cc. of ethyl acetate, 30 cc. of butyl alcohol, and 10 cc. of phenyl ethyl alcohol was coated at room temperature on the external surface of the previously applied coating to provide a strip coat. A mixture comprising 20 cc. of a silver iodobromide emulsion, 8 cc. of water, 9 cc. of methyl alcohol, 4 cc. of saponin in water, and 0.4 cc. of Igepal CO-710 (trade name of Antara Chemicals [Division of General Dyestuff Corp.] New York, N.Y., for a nonionic surfactant comprising alkylphenoxypoly [ethylenoxy] ethanols) in water was coated at 40° C. on the external surface of the previously applied strip coat to provide a photosensitive layer.

EXAMPLE 2

A mixture comprising 7.5 cc. of 12% gelatin and 0.9 cc. of a mixture of silver precipitating agents was raised to pH 10 and 40° C. 1 cc. of 5% N,N'-(1,3-phenylene)-bis-maleimide in dimethyl sulfoxide was added. The resultant mixture was coated promptly on a subbed cellulose triacetate film base at room temperature. A solution comprising 1.5 g. of carboxymethyl cellulose in 100 cc. of water was coated on the external surface of the previously applied coating to provide a strip coat. A mixture comprising 20 cc. of a silver iodobromide emulsion, 8 cc. of water, 9 cc. of methyl alcohol, 4 cc. of saponin in water, and 0.4 cc. of Igepal CO-710 in water was coated at 40° C. on the external surface of the previously applied strip coat to provide a photosensitive layer.

After the silver iodobromide emulsion coating dried, the photosensitive emulsion was exposed and processed by spreading an aqueous liquid processing composition, such as described in the aforementioned U.S. Patent No. 2,543,181, on the external surface of the photosensitive emulsion. After an imbibition period of approximately two minutes, the image-receiving element was stripped from the emulsion by a 15-second water wash at 120° F. and contained a positive transfer image of the photographed subject.

In the aforementioned example, spreading of the liquid processing composition on the external surface of the photosensitive emulsion is preferably effected by rupture of a suitably positioned frangible container and distribution of its processing composition contents by means of a spreader sheet, e.g., a cellulose acetate sheet the surface of which has been converted to cellulose. When employed, the converted cellulose acetate spreader sheet exhibited an adhesive capacity for the processing composition in excess of the adhesive capacity exhibited by the photosensitive emulsion. A means is thus provided for effecting dissociation of the processing composition from contact with the photosensitive emulsion, preferably subsequent to image formation, by dissociating the spreader sheet from its proximate relationship to the external emulsion surface.

Figure 2:
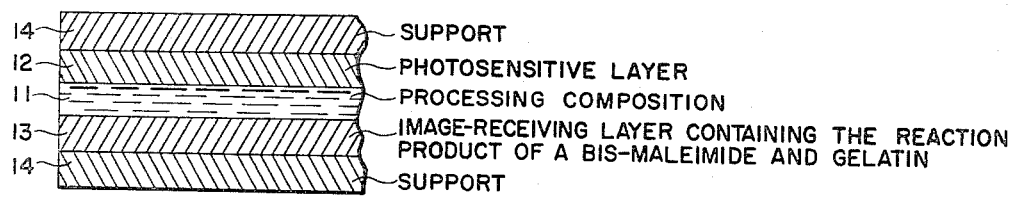
FIG. 2 is a view similar to that of FIGURE 1 illustrating the association of elements during one stage of the performance of another diffusion transfer process for the production of positive silver prints which illustrates another embodiment of the novel print-receiving elements of the present invention.

A further embodiment of the present invention is illustrated in FIG. 2, which comprises a photosensitive silver halide emulsion 12, a layer 11 of the previously noted relatively viscous film-forming processing composition, an image-receiving layer 13 containing the reaction product of a bis-maleimide and gelatin and preferably containing silver precipitating nuclei, and a support layer 14.

Layer 11 of processing composition may be distributed in a substantially uniform manner between photosensitive emulsion layer 12 and image-receiving layer 13, for example, in accordance with the procedures disclosed in the aforementioned U.S. Patent No. 2,543,181. For example, one or more rupturable containers may be attached to either photosensitive emulsion layer 11 and/or image-receiving layer 20 such that upon superposition of the respective layers 11 and 13 said container or containers are so positioned as to be capable, upon rupture, of releasing their contents in a substantially uniform layer between and in contact with the opposed surface of each of said layers. Rupture of the container or containers and spreading of the contents thereof may be accomplished, for example, by compression between a pair of opposed, suitably gapped rollers.

In carrying out the aforementioned transfer process, the photosensitive silver halide emulsion 12 is exposed to a predetermined subject matter to form therein a latent image of said subject matter. The exposed emulsion is superposed on image-receiving element 13 and the photographic processing composition 11 spread between the opposed surfaces of said photosensitive emulsion 12 and said image-receiving element 13. Reagents permeate into the photosensitive emulsion 12, developing the latent image contained therein and forming a soluble silver complex of unexposed silver halide. Soluble silver complex is transported from photosensitive emulsion layer 12, at least in part, by imbibition, to the print-receiving stratum 13 and the silver of the complex is precipitated there to provide the desired positive image. The lamination formed by the spreading of processing composition in layer 11 between photosensitive emulsion 12 and print-receiving element 13 is kept intact for approximately ½ to 1½ minute, preferably 1 minute, and at the termination of this time interval the print-receiving layer 13 is dissociated from emulsion 12, as for example, by stripping.

The following examples illustrate the fabrication of additional print-receiving elements of the present invention and the utilization thereof in diffusion transfer processes of the last-mentioned type, which, however, are not limited to the details therein set forth and are intended to be illustrative only.

EXAMPLE 3

A mixture comprising 2 cc. of 2% N,N'-(1,3-phenylene)-bis-maleimide in acetone, 7.5 cc. of 12% gelatin, and 9.5 cc. of acetone was raised to pH 10 and 40° C. The resultant composition was coated at room temperature on a conventional image-receiving sheet to provide a protective overcoat thereon.

EXAMPLE 4

A mixture comprising 50 cc. of 12% gelatin and 0.9 cc. of a mixture of silver precipitating agents was raised to pH 10 and 40° C. 15 cc. of 2% N,N'-(1,3-phenylene)-bis-maleimide in acetone was added. The resultant mixture was coated promptly on a subbed cellulose triacetate film base at room temperature. A mixture comprising 7.5 cc. of 12% gelatin and 2 cc. of 2% N,N'-(1,3-phenylene)-bis-maleimide in acetone was raised to pH 10 and 40° C. and coated at room temperature on the external surface of the previously applied coating.

EXAMPLE 5

A mixture comprising 1 gram of cellulose acetate hydrogen phthalate, 100 cc. of methanol, and 100 cc. of acetone is coated on the external surface of an image-receiving element, prepared according to the procedure of Example 4, to provide a strip coat.

A photosensitive element was exposed and processed by spreading an aqueous liquid processing composition, such as described in the aforementioned U.S. Patent No. 2,543,181, between the photosensitive element and a print-receiving element, prepared as above, as these elements were brought into superposed relationship. After an imbibition period of approximately one minute, the print-receiving element was separated and contained a positive transfer image of the photographed subject.

EXAMPLE 6

A series of photosensitive elements, each comprising a gelatino silver iodobromide emulsion, were exposed to a wedge spectrograph for 1/25 of a second.

A separate photoexposed element was then processed by spreading an aqueous liquid processing composition such as that described in U.S. Patent No. 3,087,815, issued Apr. 30, 1963, and comprising 2.5 grams of 4,6-diamino-ortho-cresol, 40 grams of 2,6-dimethyl-hydroquinone, 18.2 grams of sodium sulfite, 54 cc. of a 4% solution of 5-nitrobenzimidazole nitrate, 51 grams of sodium thiosulfate, 41.7 grams of hydroxyethyl cellulose, 60 grams of sodium hydroxide, and sufficient water to provide 1 liter, between the photoexposed element and each of the image-receiving elements, designated hereinafter as I and II, as the respective elements were brought into superposed relationship. After an imbibition period of approximately 1½ minutes, the respective image-receiving elements were separated, washed with water and the positive transfer image measured in a densitometer.

Preparation of image-receiving element No. I

To a mixture comprising 50 cc. of 12% gelatin solution, 4.0 cc. of 2.6% aqueous sodium sulfide solution, 5.0 cc. of an aqueous solution containing 2.9% lead acetate and 2.1% cadmium acetate, and sufficient 10% sodium hydroxide to maintain the mixture at a pH of 10, were added 15 cc. of a 2% solution of N,N'-(1,3-phenylene)-bis-maleimide in acetone. The resultant mixture was then coated, with a No. 5 Meyer Rod, on a subbed cellulose triacetate film base, at room temperature. To 7.5 cc. of a 12% gelatin solution, maintained at a pH of 10 with 10% sodium hydroxide, were added 2.0 cc. of a 2% solution of N,N'-(1,3-phenylene)-bis-maleimide in acetone. The resultant mixture was then coated, with a No. 3 Meyer Rod, at room temperature, on the external surface of the previously applied coating. A layer comprising ½% of cellulose acetate hydrogen phthalate in a 1:1 mixture of acetone and methanol was then coated, with a No. 5 Meyer Rod, at room temperature, on the external surface of the last-identified layer.

Preparation of image-receiving element No. II

The procedure for the preparation of Image-Receiving Element No. I was repeated except that the sodium hydroxide was deleted and the designated bis-maleimide was replaced, in each instance, by 0.3 cc. of 37% aqueous formaldehyde solution.

FIG. 4 graphically illustrates the positive image density resultant from the employment of the image-receiving elements of the present invention in the diffusion transfer processes previously described. Each of the designated image-receiving elements was processed according to the procedure detailed above to provide positive silver transfer images. As set forth in the drawings, each density curve comprises a plot of the density vs. relative log exposure of the resultant positive transfer image. Curve A is the plot of a transfer image prepared employing an image-receiving element constructed according to the disclosure of Example 1 minus the strip and photosensitive layers. Curves B and C are each the plot of a transfer image prepared employing an image-receiving element constructed according to the disclosure of Examples 4 and 5, respectively. Curves D and E are each the plot of a transfer image prepared according to the process of Example 6 and employing the image-receiving elements detailed therein as I and II, respectively. Curve E is set forth for the purpose of providing comparative data by which the magnitude of the unexpected increased positive image density, per unit of exposing radiation, provided by the instant reception elements is graphically detailed.

The magnitude of the unexpected silver transfer image density achieved by reason of the present invention and, in addition, the higher transfer image contrast attained, for a given processing formulation, render this invention especially suited for the formation of silver transfer image transparencies, which for optimum utilization, for example, for projection purposes, data storage, etc., require considerably higher density and contrast than that required for silver transfer image reflection prints. For analogous reasons, the unexpectedly high density and contrast achieved are also especially desired in multicolor additive diffusion transfer processes such as to those detailed hereinafter.

Other materials may be substituted for those previously enumerated in the foregoing products and processes and the proportions may be varied to an appreciable extent. For example, the film-forming material in the processing agent which imparts the desired viscosity to the latter may be any of the high molecular weight polymers which are stable to alkali and which are soluble in aqueous alkaline solutions. Other plastics such as hydroxyethyl cellulose, polyvinyl alcohol, and the sodium salts of polymethacrylic acid and polyacrylic acid may be used. The plastic is preferably contained in sufficient quantity to impart to the composition a viscosity in excess of 1,000 centipoises at a temperature of approximately 20° C. Preferably, the viscosity of the processing agent is of the order of 1,000 to 200,000 centipoises.

Other developing agents may be used, for example, one of the following: p-aminophenol hydrochloride; bromohydroquinone; chlorohydroquinone; diaminophenol hydrochloride; diaminophenol dihydrochloride; toluhydroquinone; monomethyl-p-aminophenol sulfate; a mixture consisting by weight of ½ hydroquinone and ½ p-hydroxyphenylaminoacetic acid; and a mixture consisting by weight of ¼ hydroquinone and ¾ p-hydroxyphenylaminoacetic acid.

To form the soluble silver complex, such other complex-forming substances as sodium thiocyanate, ammonium thiocyanate and ammonium may be employed.

As illustrated in FIG. 3, one embodiment of the present invention for use in additive multicolor diffusion transfer processes is a composite film unit comprising a transparent support 30, an additive color screen element 31, an image-receiving layer 13 containing the reaction product of a maleimide and gelatin and preferably containing silver precipitating nuclei, and a photosensitive silver halide emulsion 12.

In carrying out an additive multicolor diffusion transfer process utilizing the aforementioned composite film unit, exposure of the photosensitive silver halide emulsion to a predetermined subject matter is effected through color screen 31. A liquid processing composition is applied to photosensitive emulsion 12, as, for example, according to the procedure previously described in explanation of FIGURE 1. The liquid processing composition permeates into photosensitive emulsion 12, developing the latent image contained therein, forming an imagewise distribution of soluble silver complex, in the unexposed areas thereof, and transferring, at least part of said imagewise distribution, by imbibition, toward image-receiving layer 13 wherein the silver of said complex is precipitated to provide a reversed positive silver image of said latent image. Dissociation of emulsion layer 12 from image-receiving layer 13 may be accomplished, for example, according to the procedure previously described in explanation of FIGURE 1. As previously stated, in additive multicolor processes the viewing of the positive image takes place through a stationarily registered color screen element, either that screen element through which exposure was accomplished or a duplicate thereof. Although in the aforementioned process exposure is accomplished through the stationary color screen element predisposed in the image-receiving element, thus avoiding the problems incident upon attempts to register a mobile screen element with the deposited silver image, it must be noted that the inventive concept of the present specification is equally applicable to the numerous additive multicolor diffusion transfer process utilizing color screen elements in combination with silver transfer processes, such as, for example, the additive multicolor transfer processes disclosed in U.S. Patent No. 2,614,926, issued Oct. 21, 1952, to Edwin H. Land.

While a rupturable container, such as container 41 in FIG. 4, provides a convenient means for spreading a liquid processing composition between layers of a film unit whereby to permit the processing to be effected within a suitable camera apparatus, the processes of this invention may be otherwise effected. For example, a photosensitive element, after exposure in suitable apparatus and while preventing further exposure thereafter to actinic light, may be removed from such apparatus and permeated with the liquid processing composition as by coating the composition on said photosensitive element or otherwise wetting said element with the composition, following which the permeated, exposed, photosensitive element, still without additional exposure to actinic light, is brought into contact with the image-receiving element for image formation in the manner heretofore described. Details of such rupturable containers as illustrated in FIG. 4 may be found in U.S. Patent No. 2,634,886, issued Apr. 14, 1953, to Edwin H. Land.

Since certain changes in carrying out the above processes and certain modifications in the products which embody the invention may be made without departing from its scope, it is intended that all matter contained in the above description or shown in the accompanying drawings shall be interpreted as illustrative only and not in a limiting sense.

What is claimed is:
1. A photographic image-receiving element, for use in diffusion transfer processes, which comprises a support having affixed thereto a layer containing silver precipitation nuclei and the reaction product of gelatin and a bis-maleimide of the formula:

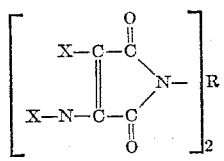

wherein each X is selected from the group consisting of hydrogen and alkyl groups, and at least one X of each maleimide nucleus is hydrogen; and R is selected from the group consisting of lower alkylene and phenylene groups.

2. A photographic image-receiving element as defined in claim 1, wherein said bis-maleimide is selected from the group consisting of N,N'-(1,2-phenylene)-bis-maleimide; N,N'-(1,3-phenylene)-bis-maleimide; N,N'-hexamethylene-bis-maleimide; and N,N'-(1,4-phenylene)-bis-maleimide.

3. A photographic image-receiving element, for use in additive color diffusion transfer processes, which comprises a common, transparent support having an additive color screen positioned between said support and an image-receiving layer containing silver precipitation nuclei and the reaction product of gelatin and a bis-maleimide of the formula:

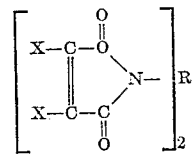

wherein each X is selected from the group consisting of hydrogen and alkyl groups, and at least one X of each maleimide nucleus is hydrogen; and R is selected from the group consisting of lower alkylene and phenylene groups.

4. In a silver diffusion transfer process, the steps which comprise developing an exposed photographic silver halide emulsion with a diffusion transfer processing composition, forming an imagewise distribution of soluble silver complex as a function of the point-to-point degree of exposure thereof, and transferring, by imbibition, at least part of said imagewise distribution of said soluble silver complex to a superposed image-receiving layer which comprises silver precipitation nuclei and the reaction product of gelatin and a bis-maleimide of the formula:

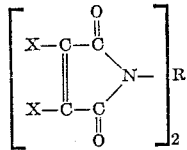

wherein each X is selected from the group consisting of hydrogen and alkyl groups, and at least one X of each maleimide nucleus is hydrogen; and R is selected from the group consisting of lower alkylene and phenylene groups; to thereby provide a silver transfer image to said image-receiving layer.

No references cited.

NORMAN G. TORCHIN, *Primary Examiner.*

R. MARTIN, *Assistant Examiner.*

UNITED STATES PATENT OFFICE
CERTIFICATE OF CORRECTION

Patent No. 3,313,625　　　　　　　　　　　　　　April 11, 1967

William H. Ryan

It is hereby certified that error appears in the above numbered patent requiring correction and that the said Letters Patent should read as corrected below.

Column 7, line 15, strike out "of", second occurrence; column 11, lines 55 to 61, for that portion of the formula reading

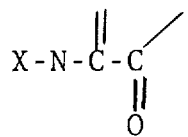　　　　　read　　　　　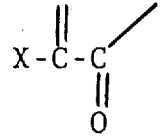

column 12, lines 20 to 26, for that portion of the formula reading

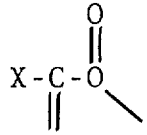　　　　　read　　　　　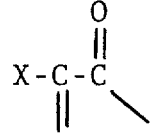

Signed and sealed this 24th day of September 1968.

(SEAL)
Attest:

EDWARD M. FLETCHER, JR.　　　　　　　　　EDWARD J. BRENNER
Attesting Officer　　　　　　　　　　　　Commissioner of Patents